United States Patent [19]

Toyokuni et al.

[11] 4,245,518
[45] Jan. 20, 1981

[54] DEVICE FOR TIGHTENING AN ENDLESS ELEMENT TRAINED OVER DRIVING MEMBERS

[75] Inventors: Kazuo Toyokuni, Sakai; Junji Miyata, Kyoto; Hiroshi Itatani; Ryozo Kuroiwa, both of Sakai, all of Japan

[73] Assignee: Kubota, Ltd., Osaka, Japan

[21] Appl. No.: 944,430

[22] Filed: Sep. 21, 1978

Related U.S. Application Data

[63] Continuation of Ser. No. 707,005, Jul. 20, 1976, abandoned.

[30] Foreign Application Priority Data

Oct. 20, 1975 [JP] Japan .................. 50-126627

[51] Int. Cl.[2] ............................................. F16H 7/08
[52] U.S. Cl. ............................ 474/111; 474/146
[58] Field of Search ...... 74/242.1 R, 242.8, 242.11 R, 74/226, 227, 242.11 B, 242.11 C

[56] References Cited

U.S. PATENT DOCUMENTS

| 1,988,421 | 1/1935 | McCann et al. | 74/242.1 R |
| 2,044,719 | 6/1936 | Stegeman | 74/242.11 R |
| 2,663,195 | 12/1953 | Horan | 74/242.11 R |
| 3,059,490 | 10/1962 | McDuffie | 74/242.1 R |
| 3,374,686 | 3/1968 | Brewer | 74/242.11 R |
| 4,121,475 | 10/1978 | McIlwain | 74/242.11 R |

FOREIGN PATENT DOCUMENTS

| 1245672 | 7/1967 | Fed. Rep. of Germany | 74/242.11 R |
| 581734 | 9/1958 | Italy | 74/242.11 R |
| 505746 | 5/1939 | United Kingdom | 74/242.11 R |
| 591083 | 8/1947 | United Kingdom | 74/242.1 R |
| 1182999 | 3/1970 | United Kingdom | 74/242.11 R |

*Primary Examiner*—Leslie Braun
*Assistant Examiner*—Conrad Berman
*Attorney, Agent, or Firm*—Edwin E. Greigg

[57] ABSTRACT

A device for tightening an endless element which is trained over driving members and which is accommodated in a drive transmission housing. A regulation member is provided outside the housing for easy adjustment of the tautness or tension of the endless element.

5 Claims, 5 Drawing Figures

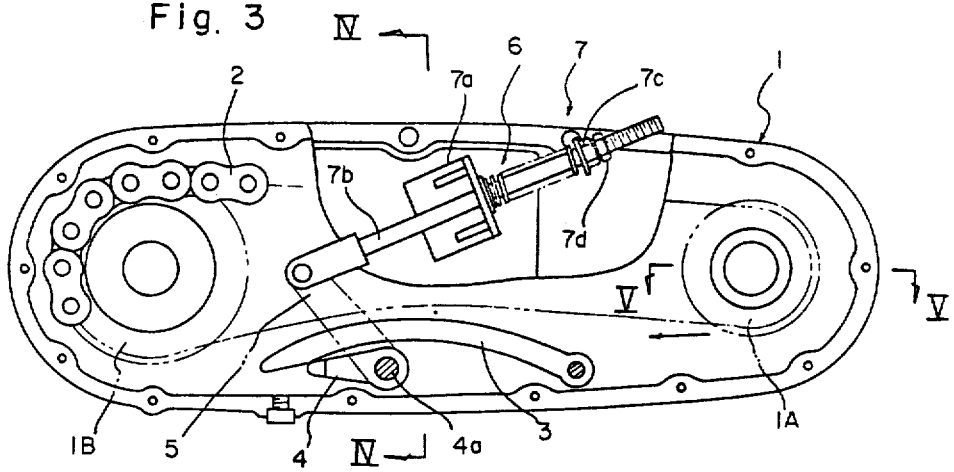
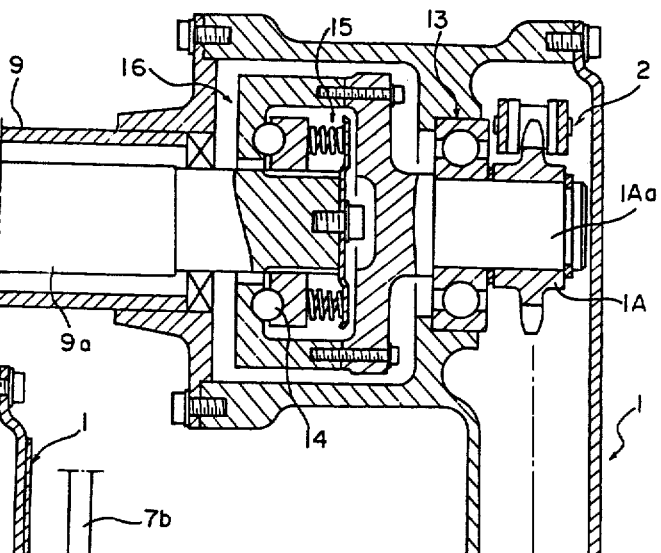
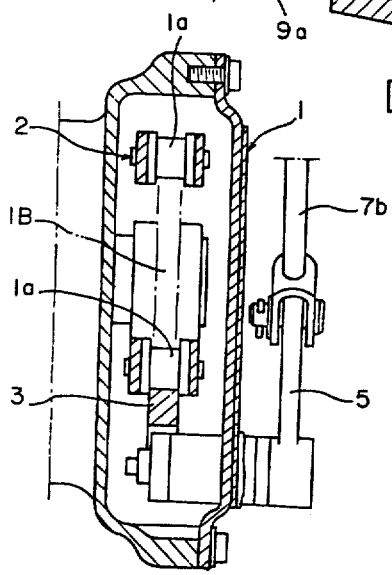

DEVICE FOR TIGHTENING AN ENDLESS ELEMENT TRAINED OVER DRIVING MEMBERS

This is a continuation of application Ser. No. 707,005, filed July 20, 1976, now abandoned.

BACKGROUND OF THE INVENTION

1. Field of the Invention

This invention relates to a tightening device for an endless driving element, for instance a gearing belt or a sprocket chain.

2. Description of the Prior Art

It is general in the conventional endless driving element tightening devices to encase or accommodate within a housing all the component parts of the tightening assembly, including a tightener element, a spring for resiliently urging the tightener element on to the endless driving element, and regulation means for adjusting the urging force between the cooperating pair of the endless driving element and tightener element, thus for adjusting the tautness or tension of the driving element. With such conventional construction, proper inspection and maintenance including replacement of the spring and readjustment or reestablishment of the proper urging force between the cooperating pair in compensation of slackening and so forth requires every time disassembling and reassembling of the housing. Such troublesome work is thus the drawback of the conventional construction.

SUMMARY OF THE INVENTION

The present invention is to provide a device for tightening an endless element which is trained over driving members and which is accommodated in a drive transmission housing, with means for resiliently urging a tightener element on to the endless element, and means for adjusting the urging force between the cooperating pair of the endless element and tightener element, both provided outside the housing, yet guaranteeing proper tightening action as desired, thus making it very easy to properly inspect and maintain the device, to replace the parts as needed and to readjust the urging force between the cooperating pair in compensation of any possible slacking, without need of disassembling and reassembling the housing in every instance of such works as above. Drawback of the conventional construction has thus been eliminated.

For this purpose, a device for tightening an endless driving element comprises according to the present invention: the endless element, which is trained, substantially in a plane, over driving members comprising a primary driving member and at least one driven or idle member, with all shafts thereof substantially parallel with one another, and which is accommodated in a drive transmission housing, defining a taut portion or tension side in rear of the primary driving member and a slack portion or non-tension side in front thereof with respect to traveling direction of the drive; a tightener element disposed in the housing substantially in the said same plane in which the endless element lies and travels, outside the space encircled by the endless element, laterally on said non-tension side of the endless element, to form a cooperative pair therewith, for free movement towards the said tension side of the endless element; tightener-sustaining means for supporting the tightener element and for urging same on to the non-tension side of the endless element; urging means provided outside the housing as power source for said urging of the cooperative pair for providing the tightening tension; and regulation means provided also outside the housing for adjusting the source power of the urging means.

With this construction, the tightener element is always urged on to the non-tension side of the endless driving member by the urging force given from the urging means to provide proper tightening tension of the endless element, while the urging force may readily be readjusted within a proper range as desired, by adjusting the regulation means associated or interlocked with the urging means as mentioned above. It is easy to provide wide adjustment range and it is thus guaranteed to provide proper tightening tension compensating any possible slackening of the endless element as may practically occur.

In addition to such wide range adjustment possibilities, the tightening device according to this invention has further eminent feature of making every attendant work very simple and easy by the provision of both the urging means and the regulation means outside the housing, thus eliminating the need of disassembling and reassembling the housing for performing the works of inspection and maintenance including replacement of the spring constituting the urging means and of readjustment or reestablishment of the proper urging force between the cooperating pair in compensation of any possible slackening and so forth.

Main object of the present invention is thus to provide a device for tightening an endless element trained over driving members, with wide range possibility of selectively adjusting the tightening tension to always realize proper tension as is desired, and with ease and convenience of every work for such adjusting and for inspection and maintenance of the entire device.

Another object of the present invention is to provide the device of the type as described above, of quite simple construction, yet guaranteeing quite secure and perfect operation.

Still another object of the invention is to provide the device of the said type, as may be manufactured easily, simply and less expensively.

For a better understanding of this invention and yet further objects and advantages, reference will be made to the following description and accompanying drawings and to the appended claims in which the new and novel features of this invention are set forth.

BRIEF DESCRIPTION OF THE DRAWINGS

FIG. 3 is a side elevation, in further enlargement, as viewed from the righthand side of FIG. 2, of a part of the cultivator essential to the present invention, with outer covering cut away and most portion thereof dismantled for clearer view of other parts, and a part of linking mechanism being also dismantled and shown in phantom;

FIG. 4 is a side elevation in still further enlargement, in section taken on line IV—IV in FIG. 3; and FIG. 5 is a sectional view, in yet further enlargement, taken on line V—V in FIG. 3.

DESCRIPTION OF THE PREFERRED EMBODIMENT

Figure 1:
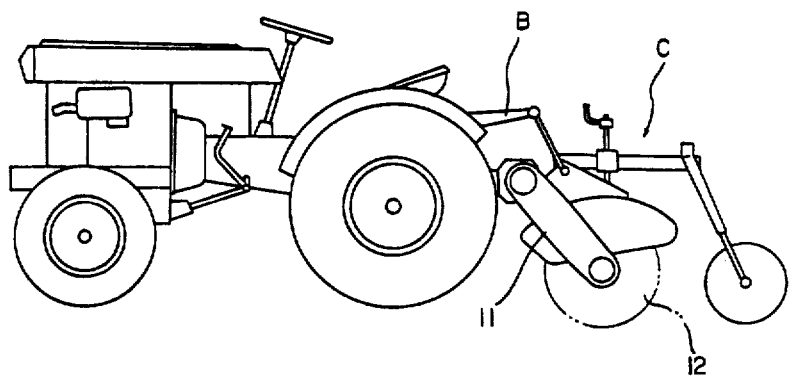
FIG. 1 is a general side elevation of a seated-operator-type cultivator to which the tightening device according to the present invention may be applied.
Figure 2:
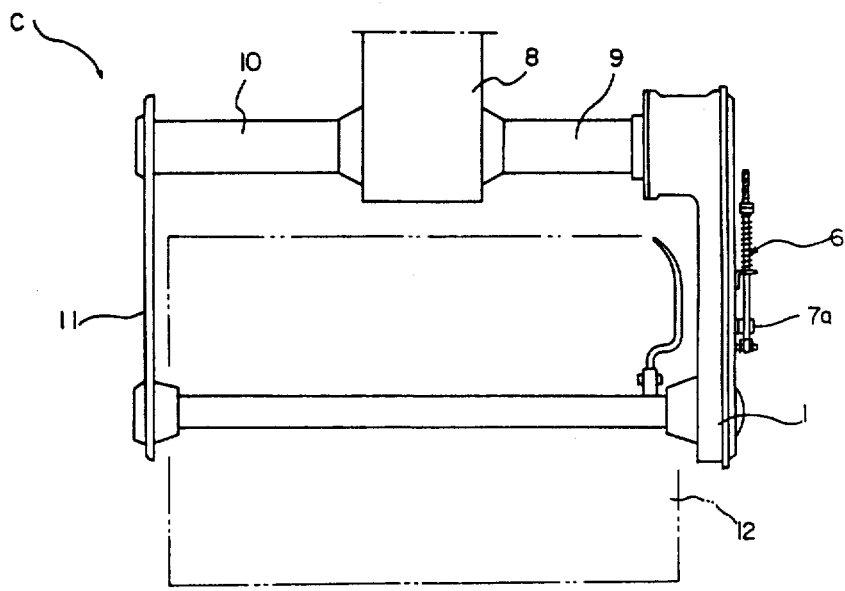
FIG. 2 is an enlarged plan view of a portion of the cultivator of FIG. 1, showing a portion of the tightening device incorporated therein according to the present invention.

How the present invention is performed is now described with reference to the drawings which show in a non-limitative manner a preferred embodiment according to the present invention. FIG. 1 shows a cultivator consisting of a tractor A with a lift arm B and a cultivation unit C of the side-drive-type attached thereto. The arm B may be actuated for raising and lowering the unit C. How the unit C is constructed is shown in FIG. 2. Drive unit housing 8 is provided in the center of the vehicle body and laterally extending to either side therefrom are a drive housing sleeve 9 and a support sleeve 10, respectively, to which are connected an elongated drive housing 1 and an elongated support frame 11, respectively, both extending rearwardly and downwardly in parallel with and opposing to each other. Rotary type cultivation implement 12 is journaled in between the rear ends of the drive housing 1 and the support frame 11.

FIGS. 3 and 4 show in more detail the drive housing 1 and the tightening device incorporated therein according to the present invention. Driving sprocket 1A is a practical example of a positive driving member operatively connected with the prime mover via transmission mechanism in the drive housing sleeve 9. Driven sprocket 1B is a practical example of a passive driving member or a driven member operatively connected with the cultivation implement 12. Sprocket chain 2 is a practical example of an endless driving element and is trained over the sprockets 1A and 1B. With the clockwise driving rotation as shown by an arrow in FIG. 3 and the driving condition as described above, the chain 2 defines taut portion or tension side in the upper flight thereof and slack portion or non-tension side in the lower flight thereof. As best shown in FIG. 4, bottom surface portion of a plurality of chain rollers 1a in the said slack portion is urged from below by a tightener element 3 pivoted at one end thereof to the housing 1 for free pivotal upward movement, namely towards the said taut portion of the chain 2, in a plane in which the endless chain 2 lies and travels. A rocker arm 4 is a practical example of tightener-sustaining means for supporting the tightener element 3 and for urging same to the chain 2, and is securely fixed to a shaft 4a journaled on the housing 1 for free rotation. An outer arm member 5 is provided outside the housing 1, or more specifically one end thereof is securely fixed to the outer end of the shaft 4a extending out through the housing 1, while the other end thereof is connected to an assembly consisting of urging means and regulation means as is to be described later; thus acting as a connecting link between the said assembly and the already described tightener-sustaining means. Generally designated at 6 is urging means for resiliently urging upper end, namely "the other end" as so referred to in the above, of the outer arm member 5, in a way as to result in urging the rocker arm 4 to pivotally rock up thus ultimately to have the tightener element 3 similarly rock up and raise the said slack portion of the chain 2 with a proper resilient impinging force on to the downwardly facing side thereof; and is constructed in the illustrated embodiment as is provided with a compression coil spring fitted on to and around a rod 7b pivotally connected to said upper end of the outer arm member 5 thus to make a joint therewith. Generally designated at 7 is regulation means which is attached to said urging means and which is for adjusting the force to pull the outer arm member 5 and thus ultimately for adjusting the resilient urging force the tightener element 3 exerts on the chain 2. For providing this, a bracket 7a is secured in the illustrated embodiment on the housing 1 to protrude outwardly therefrom and the said rod 7b is inserted through a guiding perforation provided in this bracket 7a for free sliding therethrough and with freedom also of slight angular rocking. As is clearly seen, the said spring 6 is fitted on to the rod 7b around the portion thereof outwardly of the bracket 7a. The outer extremity of this portion is toothed to receive a double-nut locking means consisting of a nut 7c and a lock nut 7d. The spring 6 is thus held in contracted or compressed state between this locking means and the said bracket 7a. To how strong a tension the chain 2 is tightened by the tightener element 3 may thus quite easily be adjusted just as desired simply by screwing back and forth the nut 7c on the toothed portion of the rod 7b. When the desired tension is obtained, then such proper state may securely be held and maintained simply by locking up the lock nut 7d.

As described above, the tightener element 3 bears directly on the chain 2, while the tightener-sustaining means bears in turn on the tightener element 3; and they are naturally all in the housing 1. However, the outer arm member 5, urging means 6 and regulation means 7 are all provided outside the housing 1 which may thus be constructed quite thin, as best seen in FIG. 4, just as in a simple drive transmission housing without any provision for tightening the chain tension, since the requirement for the width is only to properly accommodate the chain 2 and the sprockets 1A and 1B.

FIG. 5 shows in detail the construction how the driving sprocket 1A in the drive housing 1 and a driving shaft 9a encased within the drive housing sleeve 9 are operatively connected. The sprocket 1A has its shaft 1Aa journaled on a bearing 13, and there is provided, between this shaft 1Aa and the driving shaft 9a, a ball clutch generally designated at 16 which comprises a plurality of balls 14 and pressure spring 15 for exerting the frictional force to keep the normal driving connection and which is, as is well known, to automatically interrupt the driving connection when too heavy a load is exerted on to the shaft 1Aa of the sprocket 1A and thus to protect the entire driving system against injury under such overloading condition.

Though a preferred embodiment of the present invention is described as above, the tightener element 3, shown in the illustrated instance with one end thereof pivotally supported on the housing wall, may as well be constructed integrally with the said tightener-sustaining means, which latter may also be constructed differently than illustrated. For instance, pivotal mounting on the shaft 4a is by no means imperative and direct connection to the urging means 6, without the outer arm member 5 serving as a connecting link to change the direction of the urging force in the illustrated embodiment, may as well be possible.

Furthermore, urging means 6 is not restricted to a compression coil spring but it may be of any form so long as can urge the slack portion of the drive chain 2 to proper tight tension, such for instance as suitable spring of any other type, any device using weight gravity and so forth. According to the type of said urging means as actually adopted, it is easy for those skilled in the art to select regulation means 7 best suited for the respective case. It is in any way the point to provide urging means 6 and regulation means 7 outside the drive housing 1 for ease and convenience of every work for adjusting the tightening tension and for inspection and maintenance.

What we claim is:

1. A tightening device for a drive transmission comprising, in combination:
   a housing having a pair of substantially flat side walls disposed in spaced-apart, parallel relationship to define an interior,
   a pair of sprockets journaled for rotation in said housing interior in a common plane, one of said sprockets comprising a primary driving member and the other sprocket a driven member,
   an endless sprocket chain including a plurality of chain rollers trained over said sprockets and disposed within said common plane, said sprocket chain having a width slightly less than the distance between said housing side walls and disposed in close spaced-apart relationship therewith,
   a freely pivotal bow-shaped member pivotally mounted at one end on said housing side walls within said housing interior in underlying relationship with the lower reach of said chain for pivotal movement within said common plane, said bow-shaped member extending from one end in the direction of movement of said chain and having a convex upper surface and a concave lower surface, said bow-shaped member having a width for sliding engagement between said convex upper surface and said chain rollers,
   a rotatable shaft mounted on one of said housing side walls and extending transversely into said housing interior in parallel relationship to the axis of rotation of said sprockets below said bow-shaped member, said shaft having an end portion extending outwardly from one of said housing side walls,
   a radially extending arm member on said shaft end portion disposed exteriorly of said housing in spaced-apart relationship with said housing one side wall, and
   urging means supported on the outer surface of said one housing side wall connected to the outer end of said arm member for rotating said shaft in one direction to yieldingly urge said rocker arm other end into said engagement with said bow-shaped member for tensioning engagement of said bow-shaped member with said chain.

2. A tightening device in accordance with claim 1 wherein the axis of said shaft is disposed in closely spaced relationship with the convex inner surface of said bow-shaped member and wherein the length of said rocker arm is slightly greater than the spacing between the axis of said shaft and the convex inner surface of said bow-shaped member to thereby magnify the biasing force of said urging means transmitted through said rocker arm to said bow-shaped member.

3. A tightening device in accordance with claim 1 wherein said means for rotating said shaft in one direction comprises a bracket mounted on the outer surface of one of said housing side walls, a rod connected at one end to said arm member outer end slidably mounted in said bracket and spring means operatively associated with said rod for yieldingly maintaining said rocker arm outer end in engagement with said bow-shaped member convex inner surface.

4. A tightening device in accordance with claim 3 including stop means mounted on said rod adjacent the other end of said rod and wherein said spring means comprises a compression spring disclosed on said rod between said bracket and said stop means.

5. A tightening device in accordance with claim 4 including an externally threaded portion on said rod adjacent said rod other end and wherein said stop means comprises a nut threadedly engagable with said threaded rod portion for adjusting the compression of said spring to regulate the tension applied to said chain by said bow-shaped member.

* * * * *